(12) United States Patent
Chang

(10) Patent No.: US 8,602,207 B2
(45) Date of Patent: Dec. 10, 2013

(54) CONVEYOR-BELT LINKING APPARATUS OF METALLURGICAL FURNACE

(76) Inventor: Wen Yuan Chang, Miaoli County (TW)

( * ) Notice: Subject to any disclaimer, the term of this patent is extended or adjusted under 35 U.S.C. 154(b) by 116 days.

(21) Appl. No.: 13/211,400

(22) Filed: Aug. 17, 2011

(65) Prior Publication Data

US 2013/0043109 A1 Feb. 21, 2013

(51) Int. Cl.
*B65G 21/10* (2006.01)
(52) U.S. Cl.
USPC ............... 198/586; 198/600; 198/781.07
(58) Field of Classification Search
USPC ......... 198/586, 600, 812, 861.1, 594, 781.07, 198/791
See application file for complete search history.

(56) References Cited

U.S. PATENT DOCUMENTS

| | | | | |
|---|---|---|---|---|
| 1,953,300 A | * | 4/1934 | Holman | 198/470.1 |
| 4,349,097 A | * | 9/1982 | Curti | 198/586 |
| 4,478,329 A | * | 10/1984 | Heiz | 198/586 |
| 5,217,210 A | * | 6/1993 | Schutzner | 267/64.16 |
| 5,269,119 A | * | 12/1993 | Tolson | 198/586 |

* cited by examiner

*Primary Examiner* — James R Bidwell
(74) *Attorney, Agent, or Firm* — Rosenberg, Klein & Lee

(57) ABSTRACT

A conveyor-belt linking apparatus utilizes a movable frame slidably disposed on a predetermined supporting surface, a plurality of pivot shafts disposed on the movable frame to support a load object, at least one primary driving element disposed between the movable frame and the predetermined supporting surface to drive the movable frame to reciprocally and slidably move along a predetermined direction, and an engaging driving assembly including a side driving element capable of being outwardly input with a power and a transmission assembly. The transmission assembly capable of synchronically sliding with the movable frame is connected to the side driving element for transmitting the power of the side driving element to rotate each of the pivot shafts. With the movable frame capable of sliding between two conveying positions, the defects of inclination, vibration and sway of the load object resulted from a large clearance between the pivot shafts can be decreased.

34 Claims, 7 Drawing Sheets

CONVEYOR-BELT LINKING APPARATUS OF METALLURGICAL FURNACE

BACKGROUND OF THE INVENTION

1. Field of the Invention

The present invention relates to a conveyor-belt linking apparatus of a metallurgical furnace, and in particular relates to a conveyor-belt linking apparatus suitable for an engagement of separative spaces provided with gates to assure an effective conveying operation.

2. Description of the Related Art

As shown in FIG. 1, a common-use heavy load conveyor-belt device, typically having separative spaces with gates, includes two accommodation spaces 5 and 50 of different environmental conditions. A gate 52 for separation is disposed between the two accommodation spaces 5 and 50, the accommodation space 5 is provided with an outwardly connected opening 511, and a gate 51 is disposed on the opening 511. Two belt conveyors A and B respectively disposed in the accommodation spaces 5 and 50 are connected to the sides of the two gates 51 and 52, and a belt conveyor C located outside the accommodation space 5 is connected to the outside of the gate 51, wherein the belt conveyor A has a pivot shaft 91 to be connectively fixed with a plurality of load wheels 911, the belt conveyor B has a pivot shaft 92 to be connectively fixed with a plurality of load wheels 921, and the belt conveyor C has a pivot shaft 93 to be connectively fixed with a plurality of load wheels 931. A predetermined power source drives the pivot shafts 91, 92 and 93 to respectively rotate the load wheels 911, 921 and 931, so that a load object can be transmitted by the belt conveyors A, B and C.

However, in the actual applications of the conveyor-belt device, the installation of the gates 51 and 52 causes large clearances 922 and 932 respectively formed between the belt conveyors A and C and between the belt conveyors A and B, resulting in the defects such as inclination, vibration and sway of the load object in the applications or even being toppled and jammed when the load object is moved between the belt conveyors A and C or between the belt conveyors A and B and lowering the overall conveying quality.

BRIEF SUMMARY OF THE INVENTION

In view of this, the invention provides a conveyor-belt linking apparatus of a metallurgical furnace to overcome the disadvantages of the conventional conveyor-belt device.

The main purpose of the present invention is to provide a conveyor-belt linking apparatus of a metallurgical furnace, utilizing a conveyor belt structure capable of reciprocal sliding to approach a gate for space separation, so that the problems of conveying operation caused by the large clearance at two sides of the conventional belt conveyor can be solved.

To attain the purposes, functions and effects above, the technical means of the present invention comprises a movable frame, a plurality of pivot shafts and at least one primary driving element. The movable frame located between ends of two belt conveyors is slidably disposed on a predetermined supporting surface. The pivot shafts are disposed on the movable frame to support a load object and respectively driven by an external force for pivoting so that the load object moves along a predetermined direction. The primary driving element is disposed between the movable frame and the predetermined supporting surface to drive the movable frame to reciprocally and slidably move between the ends of the two belt conveyors.

According to the structure above, the conveyor-belt linking apparatus of the metallurgical furnace further comprises an engaging driving assembly including a side driving element capable of being outwardly input with a power and a transmission assembly, wherein the transmission assembly capable of synchronically sliding with the movable frame is connected to the side driving element for transmitting the power of the side driving element to rotate the pivot shafts.

According to the structure above, the side driving element is connected to a sliding guided element parallel to a sliding direction of the movable frame, the transmission assembly at least comprises a first transmission element disposed on and synchronically pivoted with the sliding guided element to remain a connective driving status relative to the pivot shafts in accordance with the movement of the movable frame.

According to the structure above, a linking element is at least disposed on each of the pivot shafts, and a second transmission element and a third transmission element connected to the second transmission element are disposed between the first transmission element and the linking element. The first transmission element and the second transmission element are bevel gears engaged to each other, and the third transmission element and the linking element are gears engaged to each other.

According to the structure above, an idler wheel disposed on the movable frame is abutted against the first transmission element, to remain a connection status of between the first transmission element and the second transmission element.

According to the structure above, the sliding guided element is a guide bar including a surface formed with a longitudinally extended recess, and the first transmission element jacketed to the guide bar comprises a convex key entering into the recess of the guide bar.

According to the structure above, a plurality of side guiding elements, capable of limiting the sliding direction of the movable frame, are disposed on the predetermined supporting surface. The side guiding elements are laterally arranged pulleys.

According to the structure above, the movable frame is disposed on the predetermined supporting surface via a plurality of rolling elements.

According to the structure above, a gate is disposed next to at least one end of the movable frame, and at least one auxiliary guiding wheel capable of idling is disposed between the gate and the movable frame.

According to the structure above, a plurality of load elements are disposed on the pivot shaft.

According to the structure above, the primary driving element is an oil cylinder.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
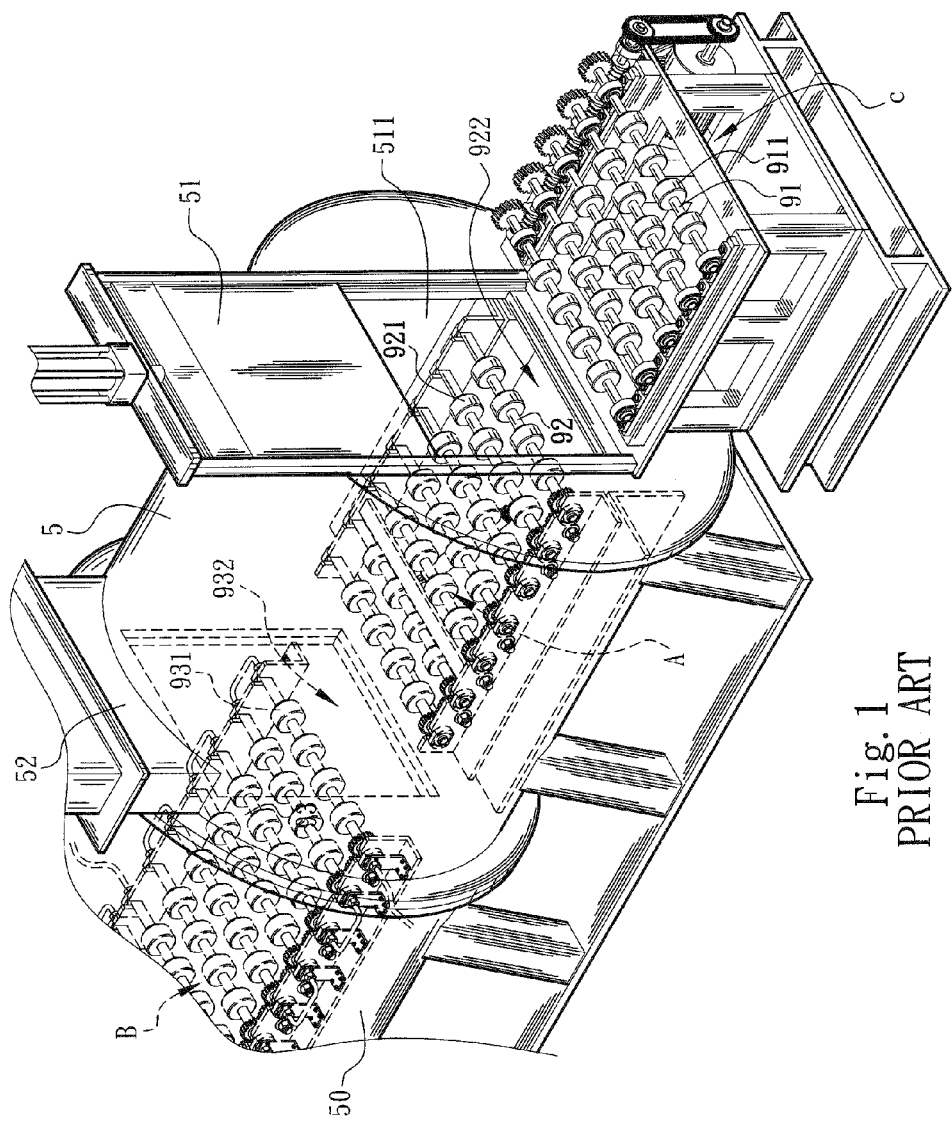
FIG. 1 is an exploded view of a conventional conveyor-belt structure applied to a separation device.
Figure 2:
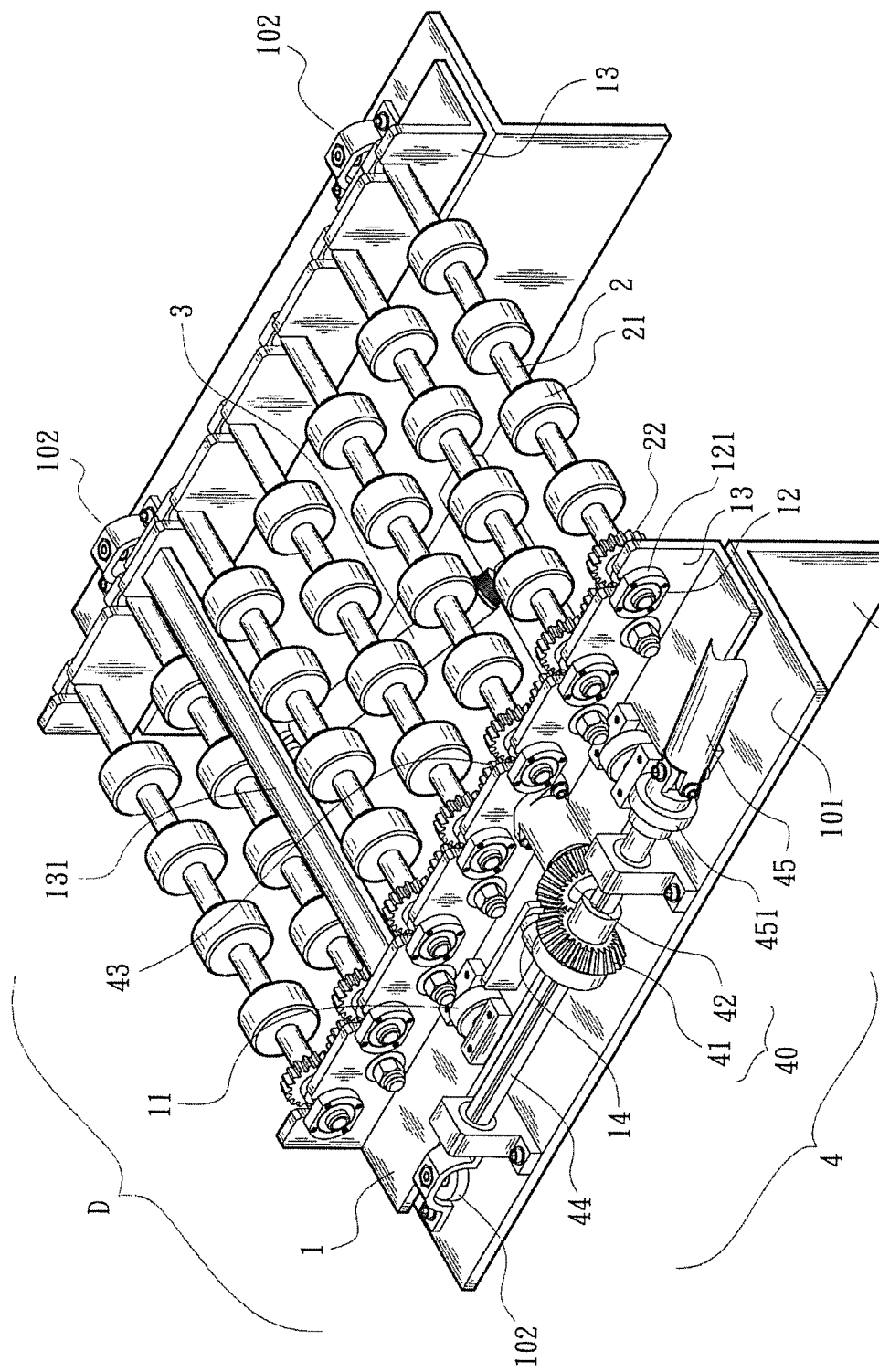
FIG. 2 is a structural exploded view of the invention.
Figure 3:
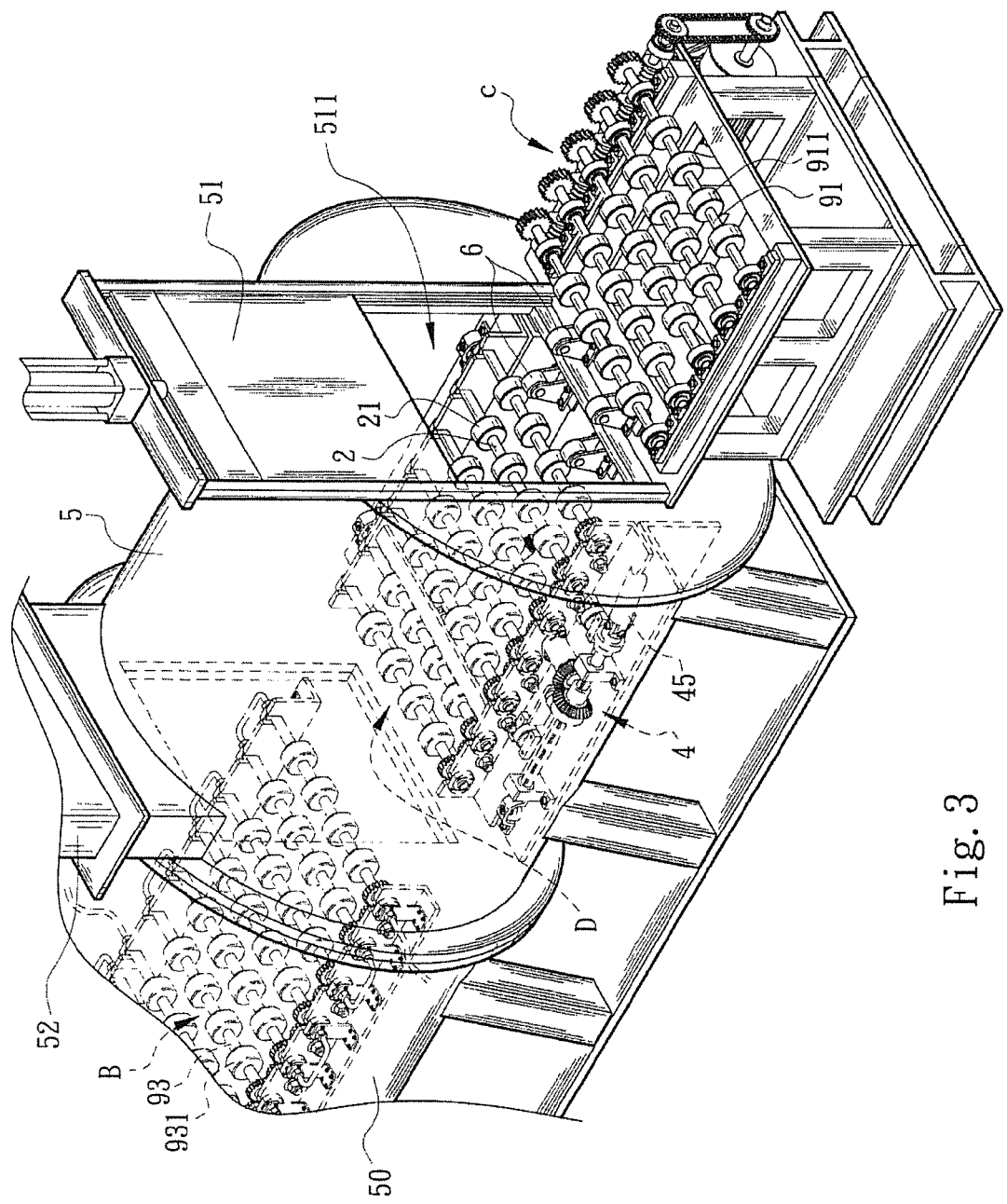
FIG. 3 is an overall outside view of the invention combined with related assemblies.
Figure 4:
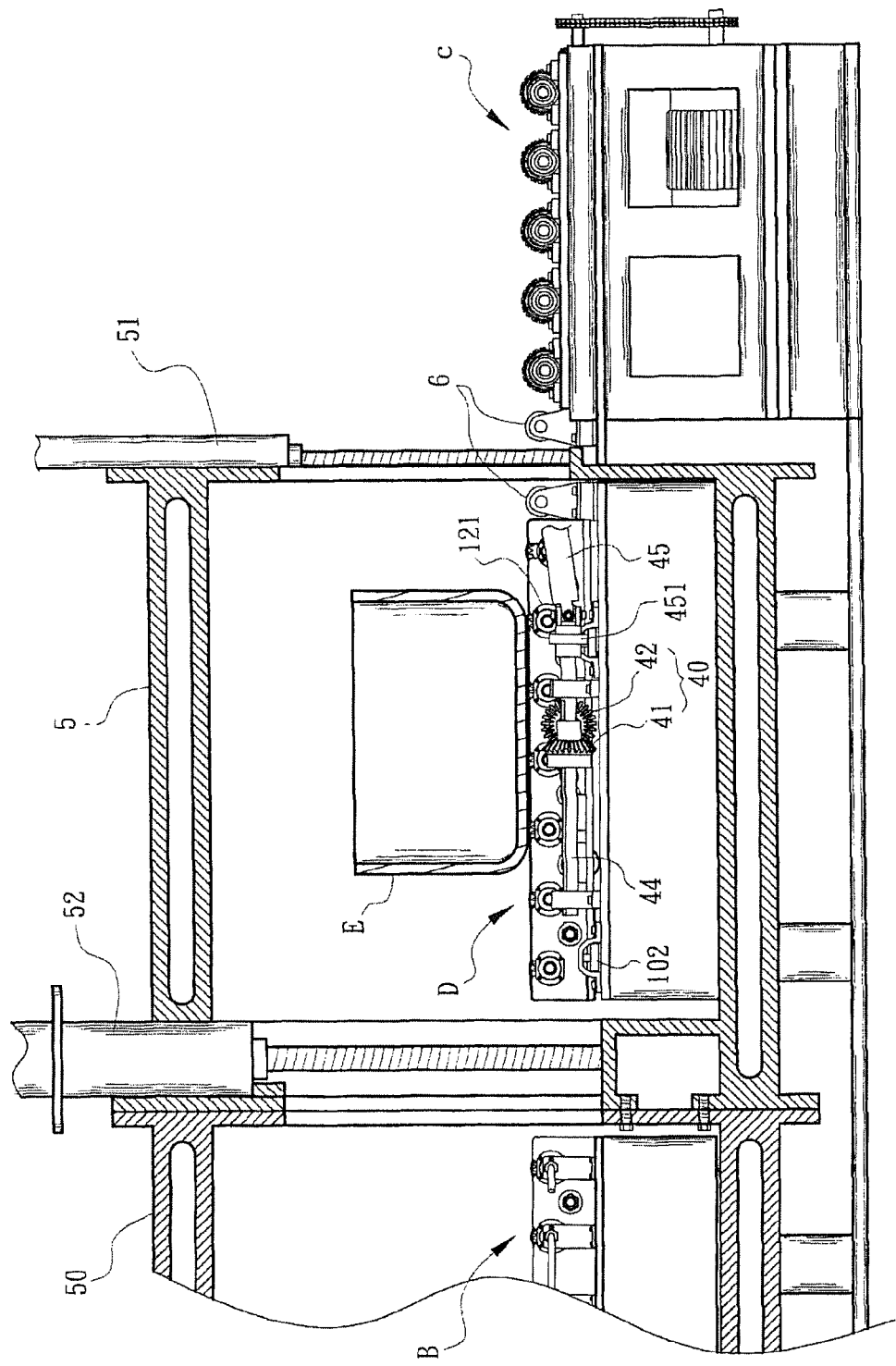
FIG. 4 is a schematic view showing a conveying movement of the invention.

Referring to FIGS. 2, 3 and 4, a conveyor belt structure D of a conveyor-belt linking apparatus of a metallurgical furnace mainly comprises a movable frame 1 located between ends of two belt conveyors B and C, a plurality of pivot shafts 2 disposed on the movable frame 1, at least one primary driving element 3, and an engaging driving assembly 4. The movable frame 1 is slidably disposed on a predetermined supporting surface 101 of a lower frame 10 via a plurality of peripherally-disposed rolling elements 11. At least two opposite supporting portions 13 are disposed on the movable frame 1, a plurality of bearing seats 121 comprised with corresponding bearings 12 are disposed on the respective supporting portions 13, and at least one connecting portion 131 is disposed between the two supporting portions 13. A plurality of side guiding elements 102, capable of limiting a sliding direction of the movable frame 1, are disposed on the predetermined supporting surface 101 of a lower frame 10. The side guiding elements 102 can be laterally arranged pulleys. The pivot shafts 2 are disposed on the bearings 12 located on the supporting portions 13, supporting a load object E thereon and respectively driven by an external force for pivoting to move the load object E along a predetermined direction. A linking element 22 is at least disposed on the respective the pivot shafts 2, and a plurality of load elements 21 capable of being placed with a load object E are disposed on the pivot shaft 2. The primary driving element 3 is disposed between the connecting portion 131 of the movable frame 1 and the lower frame 10, thereby driving the movable frame 1 to reciprocally and slidably move along a predetermined direction between the ends of the two belt conveyors B and C. The linking element 22 can be a gear, the load elements 21 can be rollers, and the primary driving element 3 can be an oil cylinder. The engaging driving assembly 4 comprises a side driving element 45 capable of being outwardly input with a power and a transmission assembly 40. The side driving element 45 of the engaging driving assembly 4 is connected to a sliding guided element 44 via an engaging element 451, wherein the sliding guided element 44 is parallel to the sliding direction of the movable frame 1. The transmission assembly 40 of the engaging driving assembly 4 comprises a first transmission element jacketed to the sliding guided element 44 and a second transmission element 42 connected or engaged to the first transmission element. The side driving element 45 can be a driving axis, the engaging element 451 can be an universal joint, the sliding guided element 44 can be a guide bar including a surface formed with a longitudinally extended recess, the first and second transmission elements 41 and 42 can be bevel gears engaged to each other, and the first transmission element jacketed to the guide bar comprises a convex key entering into the recess of the guide bar so that the first transmission element can be slidably moved on and synchronically pivoted with the guide bar (the sliding guided element 44) to remain a connective driving status relative to the pivot shafts 2 in accordance with the movement of the movable frame 1. An idler wheel 14 disposed on the movable frame 1 is abutted against the back side of the first transmission element 41, to remain a connection or engagement status of between the first transmission element 41 and the second transmission element 42 when the first transmission element 41 is moved in accordance with the movement of the movable frame 1. The second transmission element 42 is connected to the linking element 22 via a third transmission element 43, i.e., the second transmission element 42 and the third transmission element 43 connected to the second transmission element 42 are disposed between the first transmission element 41 and the linking element 22, so that the pivot shafts 2 rotate the load elements 21 to transmit the load object E.

In actual applications, the conveyor belt structure D of the conveyor-belt linking apparatus of the metallurgical furnace of the invention can be disposed in an accommodation space 5 communicated to an accommodation space 50 via at least a gate 52, wherein the environmental condition of the accommodation space 5 is different from that of the accommodation space 50. A fixed belt conveyor B is disposed in the accommodation space 50. The accommodation space 5 is provided with an outwardly connected opening 511, a gate 51 is disposed on the opening 511, and a belt conveyor C is disposed outside the opening 511. According to the requirement, a plurality of auxiliary guiding wheels 6 capable of idling can be respectively disposed between the opening 511 and the belt conveyor C and between the opening 511 and the conveyor belt structure D, or can be disposed at two sides of the gate 52. Because the load object E passing through the gate 51 or 52 is sufficiently supported by the auxiliary guiding wheels 6, the occurrence of inclination or vibration of the load object E can be lowered.

Figure 5:
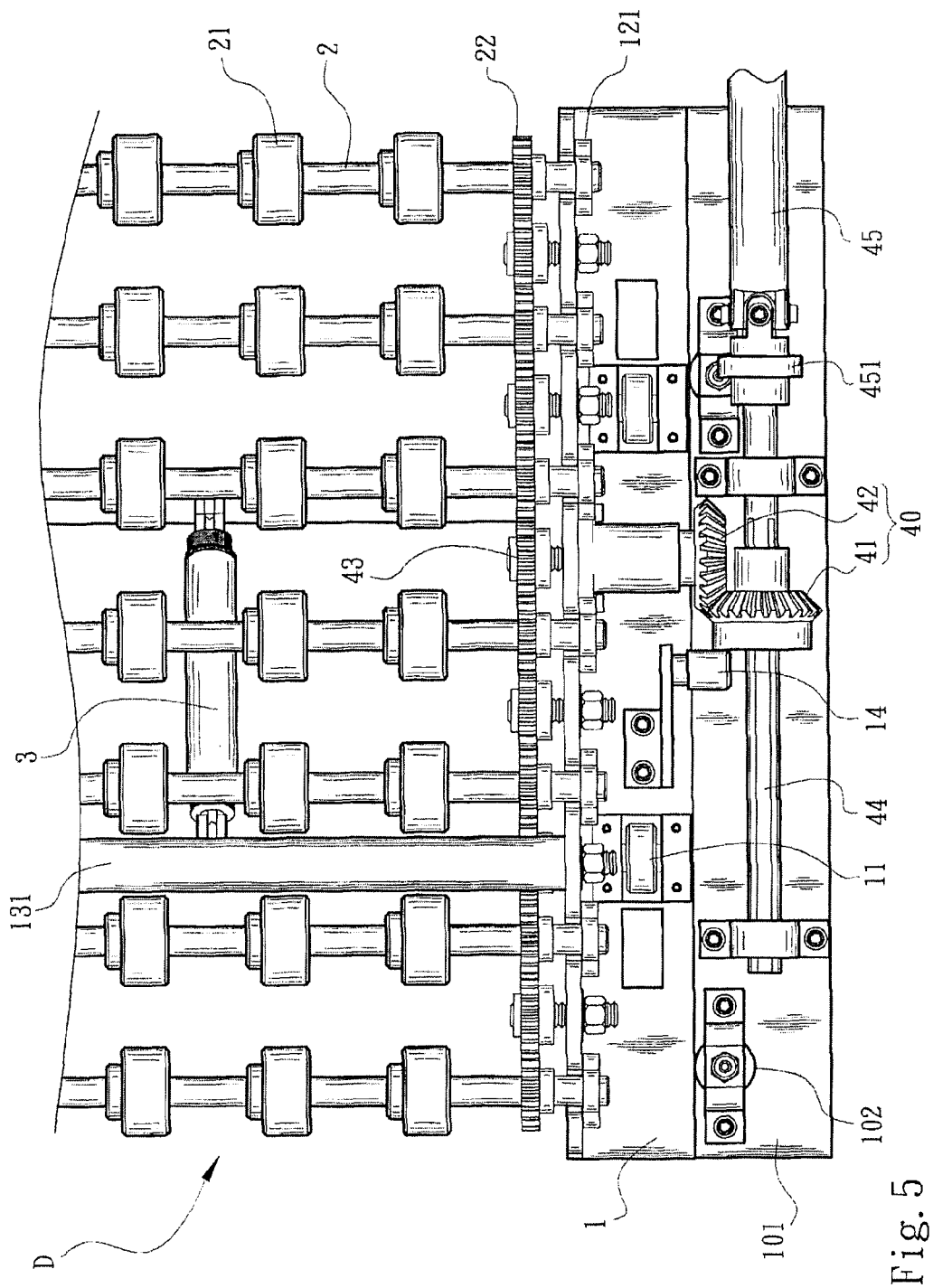
FIG. 5 is a portion movement view of an engaging driving assembly of FIG. 4.
Figure 6:
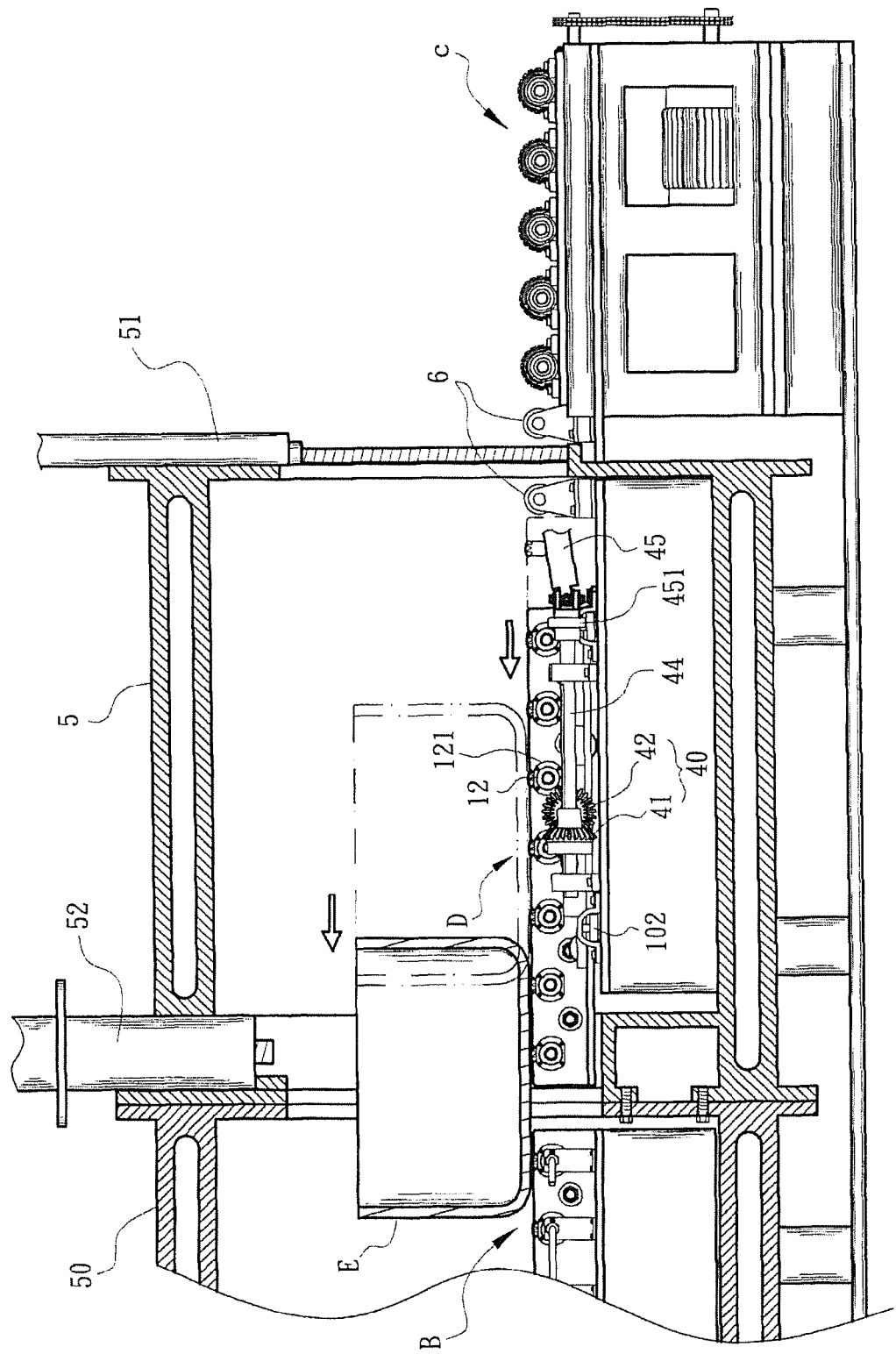
FIG. 6 is a schematic view showing a conveying movement of the invention.
Figure 7:
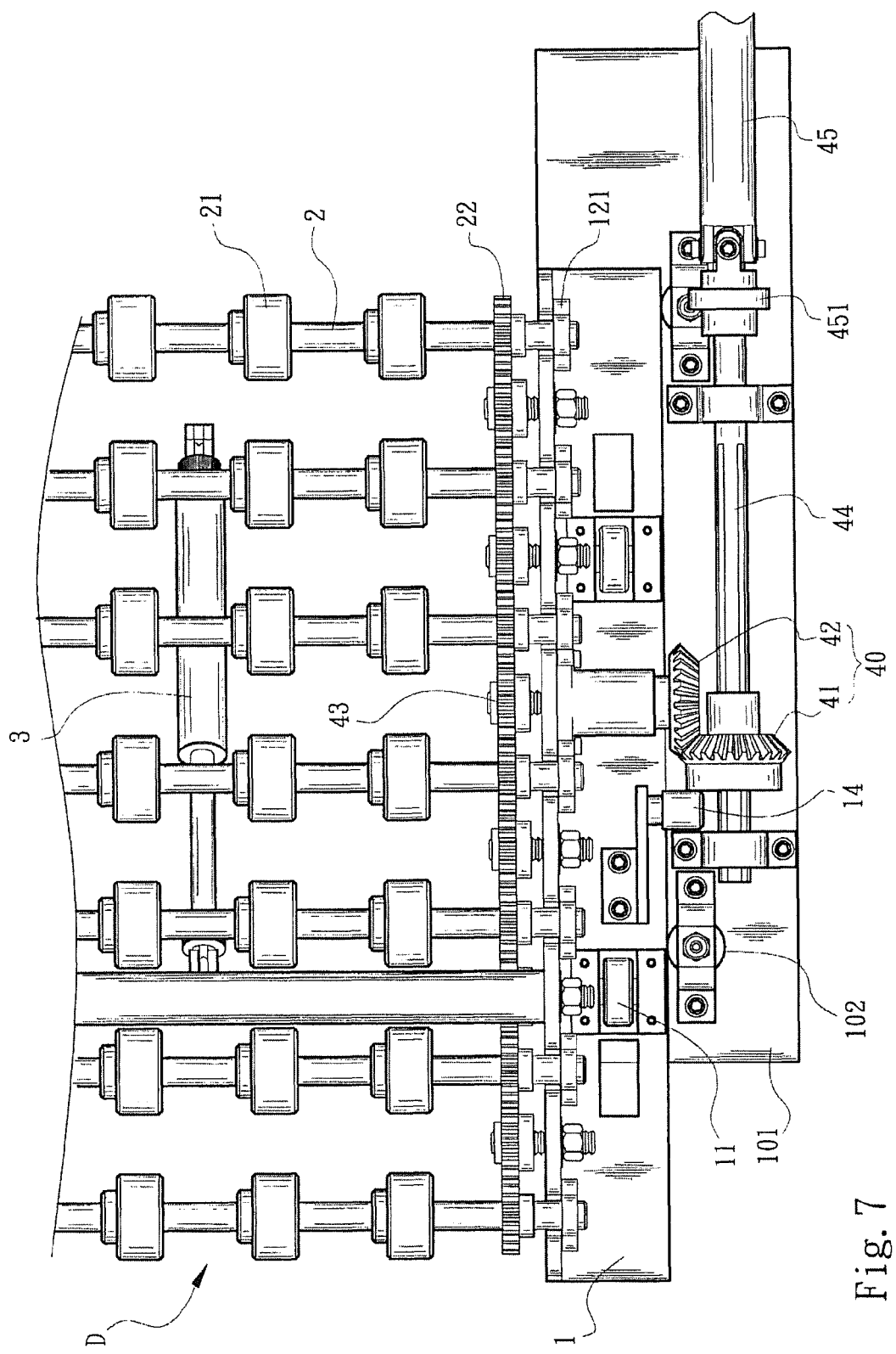
FIG. 7 is a portion movement view of an engaging driving assembly of FIG. 6.

With reference to FIGS. 4 to 7, the operation process of the conveyor belt structure D of the conveyor-belt linking apparatus is described below. When the load object E located on the belt conveyor C passes through the gate 51, the primary driving element 3 (the retraction of the oil cylinder) can drive the movable frame 1 to approach the gate 51 (as shown in FIG. 4), providing the load object E to slide to the load elements 21 (the rollers) disposed on the pivot shaft 2. Meanwhile, the first transmission element of the engaging driving assembly 4 abutted by the idler wheel 14 is moved to approach one side of the side driving element 45, so that the side driving element 45 can drive the first transmission element of the engaging driving assembly 4 to rotate through the engaging element 451 and the sliding guided element 44, and the pivot shafts 2 driven by the second transmission element 42, the third transmission element 43 and the linking element 22 are rotated (as shown in FIG. 5) to drive the load object E sliding toward the belt conveyor B. Then, the primary driving element 3 (the extension of the oil cylinder) drives the movable frame 1 to approach the gate 52 (as shown in FIG. 6) to minimize the clearance between the movable frame 1 and the belt conveyor B, and the first transmission element still engaged to the second transmission element 42 is moved to one side apart from the side driving element 45 in accordance with the movement of the movable frame 1, so that the pivot shaft 2 still remains the driving force on the load object E, to cause the load object E passing through the gate 52 to smoothly enter into the accommodation space 50 and move to the belt conveyor B (as shown in FIG. 7). The conveyor belt structure D of the invention above utilizes the reciprocal sliding of the movable frame 1 to approach the gate 51 or 52 according to the requirement, thereby shortening the clearance between the movable frame 1 and the belt conveyor B or C to reduce the hindrance of the load object E when passing through the gate 51 or 52 and remaining the load object E with smooth movement in the overall conveying process.

In summary, the conveyor-belt linking apparatus of the metallurgical furnace of the invention can obtain an improved load transmission by different separative spaces provided with gates and assure an effective conveying operation. While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A conveyor-belt linking apparatus of a metallurgical furnace, at least comprising:
  a movable frame located between ends of two belt conveyors and slidably disposed on a predetermined supporting surface;
  a plurality of pivot shafts disposed on the movable frame to support a load object and respectively driven by an external force for pivoting so that the load object moves along a predetermined direction;
  at least one primary driving element disposed between the movable frame and the predetermined supporting surface to drive the movable frame to reciprocally and slidably move between the ends of the two belt conveyors; and
  an engaging driving assembly including a side driving element capable of being outwardly input with a power and a transmission assembly, wherein the transmission assembly capable of synchronically sliding with the movable frame is connected to the side driving element for transmitting the power of the side driving element to rotate the pivot shafts;
  wherein the side driving element is connected to a sliding guided element parallel to a sliding direction of the movable frame, the transmission assembly at least comprises a first transmission element disposed on and synchronically pivoted with the sliding guided element to remain a connective driving status relative to the pivot shafts in accordance with the movement of the movable frame; and
  wherein a linking element is at least disposed on each of the pivot shafts, and a second transmission element and a third transmission element connected to the second transmission element are disposed between the first transmission element and the linking element.

2. The conveyor-belt linking apparatus of the metallurgical furnace as claimed in claim 1, wherein an idler wheel disposed on the movable frame is abutted against the first transmission element, to remain a connection status of between the first transmission element and the second transmission element.

3. The conveyor-belt linking apparatus of the metallurgical furnace as claimed in claim 2, wherein the sliding guided element is a guide bar including a surface formed with a longitudinally extended recess, and the first transmission element jacketed to the guide bar comprises a convex key entering into the recess of the guide bar.

4. The conveyor-belt linking apparatus of the metallurgical furnace as claimed in claim 3, wherein the first transmission element and the second transmission element are bevel gears engaged to each other, and the third transmission element and the linking element are gears engaged to each other.

5. The conveyor-belt linking apparatus of the metallurgical furnace as claimed in claim 1, wherein a plurality of side guiding elements capable of limiting the sliding direction of the movable frame are disposed on the predetermined supporting surface.

6. The conveyor-belt linking apparatus of the metallurgical furnace as claimed in claim 5, wherein the side guiding elements are laterally arranged pulleys.

7. The conveyor-belt linking apparatus of the metallurgical furnace as claimed in claim 1, wherein the movable frame is disposed on the predetermined supporting surface via a plurality of rolling elements.

8. The conveyor-belt linking apparatus of the metallurgical furnace as claimed in claim 1, wherein a gate is disposed next to at least one end of the movable frame, and at least one auxiliary guiding wheel capable of idling is disposed between the gate and the movable frame.

9. The conveyor-belt linking apparatus of the metallurgical furnace as claimed in claim 1, wherein a plurality of load elements are disposed on the pivot shaft.

10. The conveyor-belt linking apparatus of the metallurgical furnace as claimed in claim 1, wherein the primary driving element is an oil cylinder.

11. A conveyor-belt linking apparatus of a metallurgical furnace, at least comprising:
  a movable frame located between ends of two belt conveyors and slidably disposed on a predetermined supporting surface;
  a plurality of pivot shafts disposed on the movable frame to support a load object and respectively driven by an external force for pivoting so that the load object moves along a predetermined direction; and
  at least one primary driving element disposed between the movable frame and the predetermined supporting surface to drive the movable frame to reciprocally and slidably move between the ends of the two belt conveyors;
  wherein a gate is disposed next to at least one end of the movable frame, and at least one auxiliary guiding wheel capable of idling is disposed between the gate and the movable frame.

12. The conveyor-belt linking apparatus of the metallurgical furnace as claimed in claim 11 further comprising an engaging driving assembly including a side driving element capable of being outwardly input with a power and a transmission assembly, wherein the transmission assembly capable of synchronically sliding with the movable frame is connected to the side driving element for transmitting the power of the side driving element to rotate the pivot shafts.

13. The conveyor-belt linking apparatus of the metallurgical furnace as claimed in claim 12, wherein the side driving element is connected to a sliding guided element parallel to a sliding direction of the movable frame, the transmission assembly at least comprises a first transmission element disposed on and synchronically pivoted with the sliding guided element to remain a connective driving status relative to the pivot shafts in accordance with the movement of the movable frame.

14. The conveyor-belt linking apparatus of the metallurgical furnace as claimed in claim 13, wherein a linking element is at least disposed on each of the pivot shafts, and a second transmission element and a third transmission element connected to the second transmission element are disposed between the first transmission element and the linking element.

15. The conveyor-belt linking apparatus of the metallurgical furnace as claimed in claim 14, wherein an idler wheel disposed on the movable frame is abutted against the first transmission element, to remain a connection status of between the first transmission element and the second transmission element.

16. The conveyor-belt linking apparatus of the metallurgical furnace as claimed in claim 15, wherein the sliding guided element is a guide bar including a surface formed with a longitudinally extended recess, and the first transmission element jacketed to the guide bar comprises a convex key entering into the recess of the guide bar.

17. The conveyor-belt linking apparatus of the metallurgical furnace as claimed in claim 16, wherein the first transmission element and the second transmission element are bevel gears engaged to each other, and the third transmission element and the linking element are gears engaged to each other.

18. The conveyor-belt linking apparatus of the metallurgical furnace as claimed in claim 11, wherein a plurality of side guiding elements capable of limiting the sliding direction of the movable frame are disposed on the predetermined supporting surface.

19. The conveyor-belt linking apparatus of the metallurgical furnace as claimed in claim 18, wherein the side guiding elements are laterally arranged pulleys.

20. The conveyor-belt linking apparatus of the metallurgical furnace as claimed in claim 11, wherein the movable frame is disposed on the predetermined supporting surface via a plurality of rolling elements.

21. The conveyor-belt linking apparatus of the metallurgical furnace as claimed in claim 11, wherein a plurality of load elements are disposed on the pivot shaft.

22. The conveyor-belt linking apparatus of the metallurgical furnace as claimed in claim 11, wherein the primary driving element is an oil cylinder.

23. A conveyor-belt linking apparatus of a metallurgical furnace, at least comprising:
   a movable frame located between ends of two belt conveyors and slidably disposed on a predetermined supporting surface;
   a plurality of pivot shafts disposed on the movable frame to support a load object and respectively driven by an external force for pivoting so that the load object moves along a predetermined direction; and
   at least one primary driving element disposed between the movable frame and the predetermined supporting surface to drive the movable frame to reciprocally and slidably move between the ends of the two belt conveyors;
   wherein the primary driving element is an oil cylinder.

24. The conveyor-belt linking apparatus of the metallurgical furnace as claimed in claim 23 further comprising an engaging driving assembly including a side driving element capable of being outwardly input with a power and a transmission assembly, wherein the transmission assembly capable of synchronically sliding with the movable frame is connected to the side driving element for transmitting the power of the side driving element to rotate the pivot shafts.

25. The conveyor-belt linking apparatus of the metallurgical furnace as claimed in claim 24, wherein the side driving element is connected to a sliding guided element parallel to a sliding direction of the movable frame, the transmission assembly at least comprises a first transmission element disposed on and synchronically pivoted with the sliding guided element to remain a connective driving status relative to the pivot shafts in accordance with the movement of the movable frame.

26. The conveyor-belt linking apparatus of the metallurgical furnace as claimed in claim 25, wherein a linking element is at least disposed on each of the pivot shafts, and a second transmission element and a third transmission element connected to the second transmission element are disposed between the first transmission element and the linking element.

27. The conveyor-belt linking apparatus of the metallurgical furnace as claimed in claim 26, wherein an idler wheel disposed on the movable frame is abutted against the first transmission element, to remain a connection status of between the first transmission element and the second transmission element.

28. The conveyor-belt linking apparatus of the metallurgical furnace as claimed in claim 27, wherein the sliding guided element is a guide bar including a surface formed with a longitudinally extended recess, and the first transmission element jacketed to the guide bar comprises a convex key entering into the recess of the guide bar.

29. The conveyor-belt linking apparatus of the metallurgical furnace as claimed in claim 28, wherein the first transmission element and the second transmission element are bevel gears engaged to each other, and the third transmission element and the linking element are gears engaged to each other.

30. The conveyor-belt linking apparatus of the metallurgical furnace as claimed in claim 23, wherein a plurality of side guiding elements capable of limiting the sliding direction of the movable frame are disposed on the predetermined supporting surface.

31. The conveyor-belt linking apparatus of the metallurgical furnace as claimed in claim 30, wherein the side guiding elements are laterally arranged pulleys.

32. The conveyor-belt linking apparatus of the metallurgical furnace as claimed in claim 23, wherein the movable frame is disposed on the predetermined supporting surface via a plurality of rolling elements.

33. The conveyor-belt linking apparatus of the metallurgical furnace as claimed in claim 23, wherein a gate is disposed next to at least one end of the movable frame, and at least one auxiliary guiding wheel capable of idling is disposed between the gate and the movable frame.

34. The conveyor-belt linking apparatus of the metallurgical furnace as claimed in claim 23, wherein a plurality of load elements are disposed on the pivot shaft.

* * * * *